United States Patent
Yang et al.

(10) Patent No.: US 12,032,253 B1
(45) Date of Patent: Jul. 9, 2024

(54) LIQUID CRYSTAL DISPLAY SMART WINDOW

(71) Applicant: LG Display Co., Ltd., Seoul (KR)

(72) Inventors: Seung Ryul Yang, Paju-si (KR); Jung Ill Cho, Paju-si (KR); Jae Lyang Kim, Paju-si (KR); Eui Jung Kim, Paju-si (KR); Chang Kyeong Kong, Paju-si (KR); Hyun Cheol Cho, Paju-si (KR); Sang Mook Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/465,010

(22) Filed: Sep. 11, 2023

(30) Foreign Application Priority Data

Dec. 16, 2022 (KR) .................. 10-2022-0177077

(51) Int. Cl.
| | | |
|---|---|---|
| G02F 1/13 | (2006.01) | |
| B32B 3/06 | (2006.01) | |
| B32B 7/12 | (2006.01) | |
| B32B 17/10 | (2006.01) | |
| G02F 1/1335 | (2006.01) | |
| G02F 1/1362 | (2006.01) | |

(52) U.S. Cl.
CPC .......... *G02F 1/136209* (2013.01); *B32B 3/06* (2013.01); *B32B 7/12* (2013.01); *B32B 17/10036* (2013.01); *B32B 17/10146* (2013.01); *B32B 17/10293* (2013.01); *G02F 1/133514* (2013.01); *G02F 1/133531* (2021.01); *B32B 2305/34* (2013.01); *B32B 2457/202* (2013.01); *B32B 2457/208* (2013.01)

(58) Field of Classification Search
None
See application file for complete search history.

(56) References Cited

U.S. PATENT DOCUMENTS

| | | | | |
|---|---|---|---|---|
| 7,356,969 B1 * | 4/2008 | Yurth | ........................ | E06B 9/24 |
| | | | | 52/171.3 |
| 10,845,665 B1 * | 11/2020 | Bayat | ........................ | E06B 9/24 |

* cited by examiner

*Primary Examiner* — Thanh Nhan P Nguyen
(74) *Attorney, Agent, or Firm* — Fenwick & West LLP (57) ABSTRACT

Disclosed is a liquid crystal display (LCD) smart window configured such that a transparent LCD device is mounted in a double-glazed window. The LCD smart window includes an inner glass sheet located in an indoor space, an outer glass sheet spaced apart from the inner glass sheet by a predetermined gap and located so as to be exposed to the outside of a building, a transparent LCD device located in a space between the inner glass sheet and the outer glass sheet to display an image, a window frame supporting upper and lower surfaces and both side surfaces of the inner glass sheet and the outer glass sheet, and a light source secured to the window frame to emit light to at least one surface of the outer glass sheet.

10 Claims, 6 Drawing Sheets

LIQUID CRYSTAL DISPLAY SMART WINDOW

CROSS-REFERENCE TO RELATED APPLICATION

This application claims the benefit of Republic of Korea Patent Application No. 10-2022-0177077, filed on Dec. 16, 2022, which is hereby incorporated by reference in its entirety.

BACKGROUND

Field of Technology

The present disclosure relates to a liquid crystal display (LCD) smart window in which a transparent LCD device is mounted inside a double-glazed window.

Discussion of the Related Art

In general, double-glazed windows are installed in apartments, office buildings, and the like in order to improve soundproofing, wind proofing, and heat insulation functions.

Double-glazed windows exhibit excellent soundproofing and heat insulation effects, but allow light to completely pass therethrough. Therefore, in order to avoid direct sunlight, a curtain or a window blind needs to be installed on the inside of the window, or semi-light-transmissive coated paper or a window shade needs to be attached to the surface of the window.

However, a curtain makes it difficult to continuously adjust the amount of light entering an indoor space through the window because entrance of light is completely allowed or blocked depending on opening and closing of the curtain. A window blind enables adjustment of the amount of light entering an indoor space through change in the angle of slats, but has a problem in that the slats block the user's view.

In the case of attaching semi-light-transmissive coated paper to the surface of the window to block direct sunlight, it is also impossible to continuously adjust the amount of light entering an indoor space through the window. In the case of directly attaching a window shade to a certain portion of the window to block light, a user experiences inconvenience of having to manually attach or detach the window shade to or from the window whenever opening and closing the window.

Further, windows themselves have a plain and simple design without any decorative function, and therefore, it is difficult to improve aesthetics of window products.

SUMMARY

Accordingly, the present disclosure is directed to a liquid crystal display (LCD) smart window that substantially obviates one or more problems due to limitations and disadvantages of the related art.

An object of the present disclosure is to provide a liquid crystal display (LCD) smart window, which is configured such that a transparent LCD device having a touch function is mounted inside a double-glazed window in order to display an image thereon using the natural light (daylight) during the daytime and to display an image thereon using a separate backlight source at night. The LCD smart window is capable of controlling the amount of light passing therethrough by controlling operation of the transparent LCD device.

Additional advantages, objects, and features of the disclosure will be set forth in part in the description which follows and in part will become apparent to those having ordinary skill in the art upon examination of the following or may be learned from practice of the disclosure. The objects and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a liquid crystal display (LCD) smart window includes an inner glass sheet located in an indoor space, an outer glass sheet spaced apart from the inner glass sheet by a predetermined gap and located so as to be exposed to the outside of a building, a transparent LCD device located in a space between the inner glass sheet and the outer glass sheet to display an image, a window frame supporting upper and lower surfaces and both side surfaces of each of the inner glass sheet and the outer glass sheet, and a light source secured to the window frame to emit light to at least one surface of the outer glass sheet.

The LCD smart window may further include a gap filler filling the space between the inner glass sheet and the outer glass sheet.

The gap filler may be located between the inner glass sheet and the outer glass sheet, and may be disposed at positions where the upper and lower surfaces and both side surfaces of each of the inner glass sheet and the outer glass sheet are adjacent to the window frame.

The transparent LCD device may be adhered to the inner glass sheet by means of a transparent optical adhesive.

The outer glass sheet may have an engraved pattern formed on one surface thereof facing the transparent LCD device in order to function as a light guide plate to radiate light introduced thereinto from the light source to the transparent LCD device.

The light source may include first and second light-emitting diode (LED) bars, each of which is configured such that a plurality of LEDs are mounted on a printed circuit board (PCB), and the first and second LED bars may be respectively disposed on the upper and lower surfaces of the outer glass sheet, or on the both side surfaces of the outer glass sheet.

The window frame may have a guide groove formed in a lower surface thereof so as to be movable along a guide rail of a window sill (window sash).

The transparent LCD device may be an LCD device having a touch sensing function to sense a touch point and to output information corresponding to the touch point or to perform an arithmetic operation corresponding to the touch point.

The transparent LCD device may include a thin-film transistor array substrate, a color filter array substrate, a liquid crystal layer interposed between the thin-film transistor array substrate and the color filter array substrate, a lower polarizing plate disposed below the thin-film transistor array substrate, and an upper polarizing plate disposed above the color filter array substrate. The polarization axes of the upper polarizing plate and the lower polarizing plate and the orientation direction of a liquid crystal of the liquid crystal layer may be identical to each other.

The transparent LCD device may be in a normally white mode to allow light to be transmitted from the lower polarizing plate to the upper polarizing plate when not driven.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Advantages and features of the present disclosure and methods for achieving them will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims.

In the drawings for explaining the exemplary embodiments of the present disclosure, for example, the illustrated shape, size, ratio, angle, and number are given by way of example, and thus, are not limited to the disclosure. Throughout the present specification, the same reference numerals designate the same constituent elements. In addition, in the following description of the present disclosure, a detailed description of known functions and configurations incorporated herein will be omitted when it may make the subject matter of the present disclosure rather unclear.

The terms "comprises," "includes," and/or "has", used in this specification, do not preclude the presence or addition of other elements unless used along with the term "only". The singular forms are intended to include the plural forms as well, unless the context clearly indicates otherwise.

In the interpretation of constituent elements, the constituent elements are interpreted as including an error range even if there is no explicit description thereof.

In the description of the various embodiments, when describing positional relationships, for example, when the positional relationship between two parts is described using "on", "above", "below", "next to", or the like, one or more other parts may be located between the two parts unless the term "directly" or "closely" is used.

The terms "first", "second", etc. may be used to distinguish various components. However, functions or structures of the components are not limited by names of the components or ordinal numbers prefixed to the component names. Since essential components are mainly stated in the claims, ordinal numbers prefixed to names of the components stated in the claims may not match ordinal numbers prefixed to names of the components described in embodiments of the disclosure.

The features of embodiments of the disclosure can be partially combined or entirely combined with each other, and can be technically interlocking-driven in various ways. The embodiments can be independently implemented, or can be implemented in conjunction with each other.

Hereinafter, various embodiments of the present disclosure will be described in detail with reference to the accompanying drawings.

Figure 1:
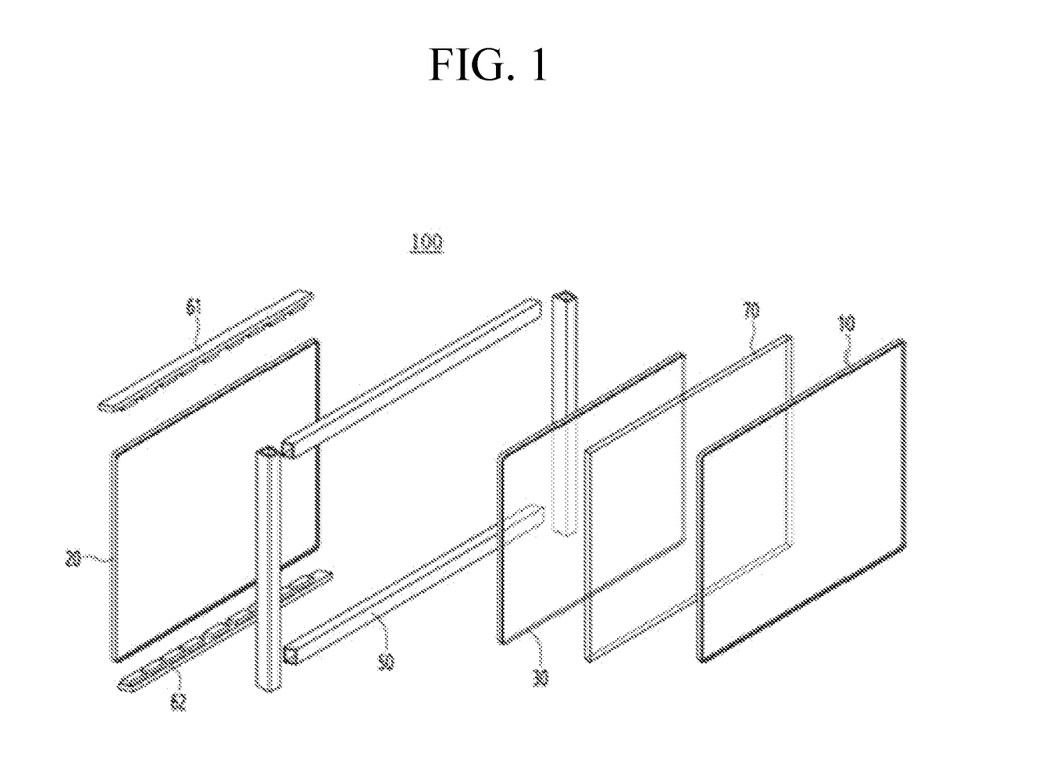
FIG. 1 is an exploded perspective view of a liquid crystal display (LCD) smart window according to an embodiment of the present disclosure.
Figure 2:
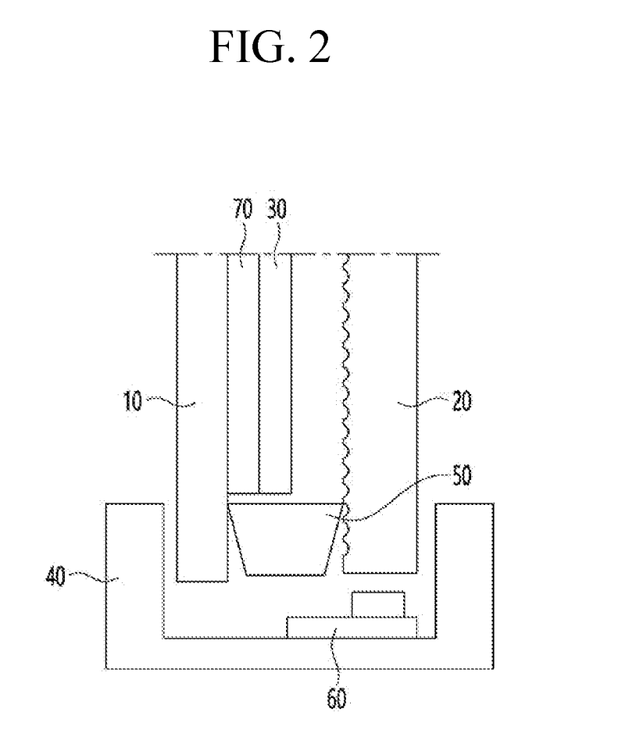
FIG. 2 is a cross-sectional view of an LCD smart window according to a first embodiment of the present disclosure.

FIG. 1 is an exploded perspective view of a liquid crystal display (LCD) smart window according to an embodiment of the present disclosure, and FIG. 2 is a cross-sectional view of an LCD smart window according to a first embodiment of the present disclosure.

As shown in FIGS. 1 and 2, an LCD smart window 100 according to an embodiment of the present disclosure includes an inner glass sheet 10 located in an indoor space, an outer glass sheet 20 spaced apart from the inner glass sheet 10 by a predetermined gap and located so as to be exposed to the outside of a building, a transparent LCD device 30 located in a space between the inner glass sheet 10 and the outer glass sheet 20 to display an image, a window frame 40 supporting the inner glass sheet 10 and the outer glass sheet 20, a gap filler 50 filling the space between the inner glass sheet 10 and the outer glass sheet 20, and a light source 60 secured to the bottom of the window frame 40 to emit light to one surface of the outer glass sheet 20.

The window frame 40 may be configured to support the upper and lower surfaces and both side surfaces of the inner glass sheet 10 and the outer glass sheet 20. The window frame 40 may be configured to fix the upper and lower surfaces and both side surfaces of the inner glass sheet 10 and the outer glass sheet 20 using an adhesive such as silicone.

The transparent LCD device 30 may be adhered to the inner glass sheet 10 by means of a transparent optical adhesive 70 such as an optically clear adhesive (OCA) or an optically clear resin (OCR). The transparent LCD device 30 may be an in-cell touch transparent LCD device having a touch sensing function.

The gap filler 50 may be located between the inner glass sheet 10 and the outer glass sheet 20, and may be disposed at positions where the upper and lower surfaces and both side surfaces of each of the inner glass sheet 10 and the outer glass sheet 20 are adjacent to the window frame 40.

The outer glass sheet 20 may have an engraved pattern formed on one surface thereof, which faces the transparent LCD device 30, in a wave shape, a circular shape, or a triangular shape. Therefore, the outer glass sheet 20 may function as a light guide plate that evenly radiates the light introduced thereinto from the light source 60 to the rear surface of the transparent LCD device 30.

The light source 60 may include first and second light-emitting diode (LED) bars 61 and 62, each of which is configured such that a plurality of LEDs is mounted on a printed circuit board (PCB). The first and second LED bars 61 and 62 may be respectively disposed on the upper surface and the lower surface of the outer glass sheet 20. However, the disclosure is not limited thereto. Only one of the first and second LED bars 61 and 62 may be disposed on the upper surface or the lower surface of the outer glass sheet 20.

The first or second LED bar 61 or 62 is disposed between the bottom surface of the window frame 40 and the upper or lower surface of the outer glass sheet 20. Therefore, the light emitted from the first or second LED bar 61 or 62 may be incident on the upper surface or the lower surface of the outer glass sheet 20, may travel to the surface of the outer glass sheet 20, on which the engraved pattern is formed, and may be radiated to the rear surface of the transparent LCD device 30.

The window frame 40 is illustrated in FIG. 2 as being applied to a fixed-type LCD smart window, but the disclosure is not limited thereto. The window frame 40 may also be applied to a sliding-type LCD smart window, which is movable along a guide rail of a window sill (window sash).

Figure 3:
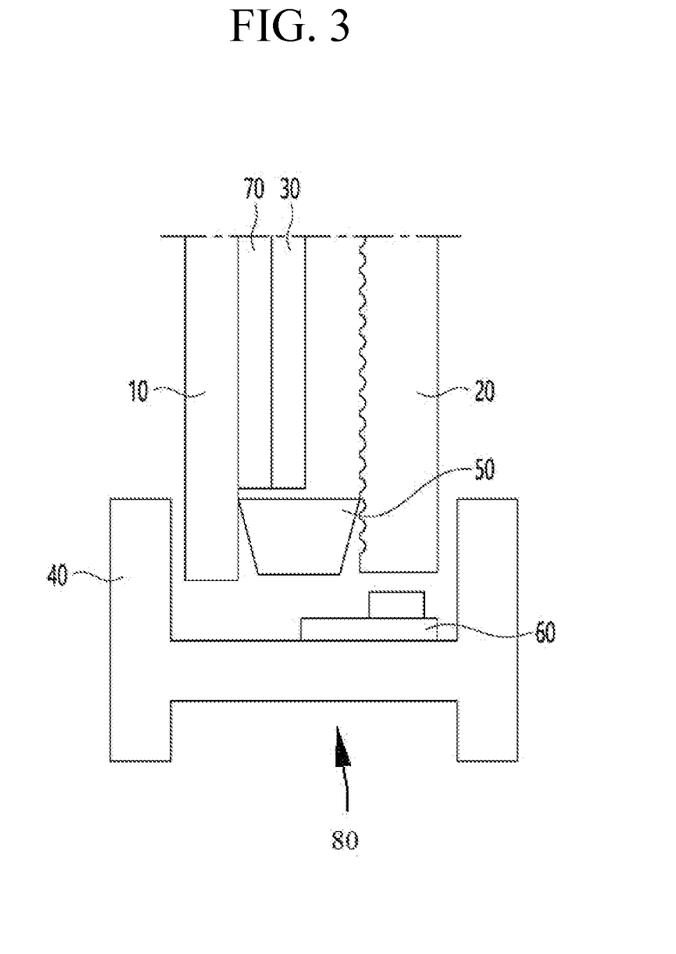
FIG. 3 is a cross-sectional view of an LCD smart window according to a second embodiment of the present disclosure.

FIG. 3 is a cross-sectional view of an LCD smart window according to a second embodiment of the present disclosure.

An LCD smart window according to a second embodiment of the present disclosure includes an inner glass sheet 10, an outer glass sheet 20, a transparent LCD device 30, a window frame 40, a gap filler 50, and a light source 60, which are the same as those of the first embodiment of the present disclosure described with reference to FIGS. 1 and 2. However, compared to the first embodiment, the second embodiment is different in that a guide groove 80 is formed in the lower surface of the window frame 40 along a guide rail of a window sill (window sash; not shown).

Although the light source 60 (the first or second LED bar 61 or 62) is illustrated in FIGS. 1 to 3 as being disposed above or below the outer glass sheet 20, the disclosure is not limited thereto. The light source 60 (the first or second LED bar 61 or 62) may be disposed on the left or right of the outer glass sheet 20 depending on the structure of the window frame 40.

Figure 4:
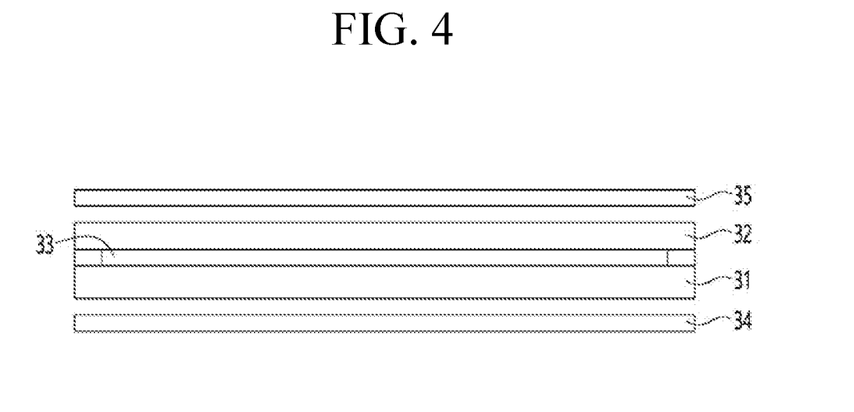
FIG. 4 is a cross-sectional view showing the configuration of a transparent LCD device 30 according to an embodiment of the present disclosure.
Figure 5:
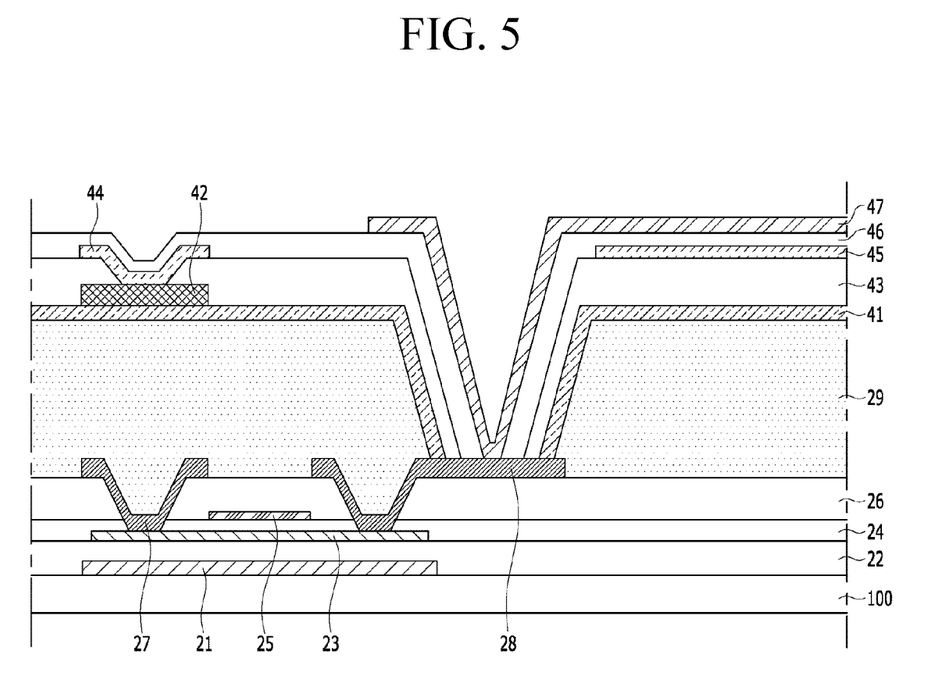
FIG. 5 is a cross-sectional view showing the structure of a thin-film transistor array substrate 31 according to an embodiment of the present disclosure in detail.
Figure 6:
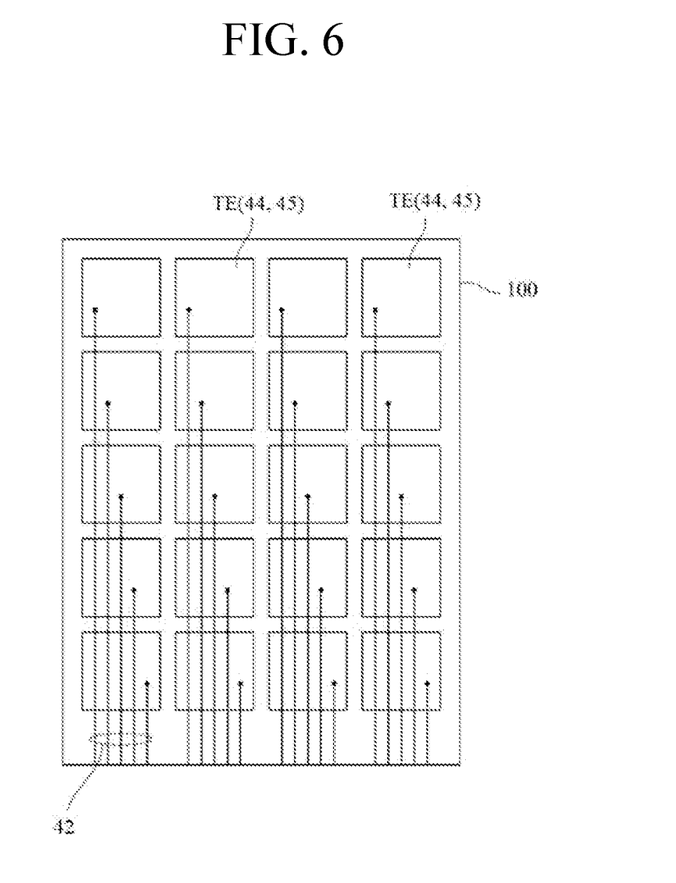
FIG. 6 is a plan view of a touch electrode (a common electrode) according to an embodiment of the present disclosure.

FIG. 4 is a cross-sectional view showing the configuration of the transparent LCD device 30 according to the embodiment of the present disclosure, FIG. 5 is a cross-sectional view showing the structure of a thin-film transistor array substrate 31 according to an embodiment of the present disclosure in detail, and FIG. 6 is a plan view of a touch electrode (a common electrode) according to an embodiment of the present disclosure.

The transparent LCD device 30 according to the embodiment of the present disclosure may be implemented as an in-cell-type touch panel LCD device, which is configured such that a touch sensor is embedded in a pixel area of the LCD device.

When a user touches a touch panel with the hand, a stylus pen, or the like, electrical characteristics such as resistance or capacitance vary at the touch point. Based thereon, the touch panel LCD device senses the touch point, and outputs information corresponding to the touch point or performs an arithmetic operation corresponding to the touch point.

As shown in FIG. 4, the transparent LCD device 30 according to the embodiment of the present disclosure includes a thin-film transistor array substrate 31, a color filter array substrate 32, a liquid crystal layer 33 interposed between the thin-film transistor array substrate 31 and the color filter array substrate 32, a lower polarizing plate 34 disposed below the thin-film transistor array substrate 31, and an upper polarizing plate 35 disposed above the color filter array substrate 32.

A plurality of gate lines, a plurality of data lines, and a plurality of common electrodes may be formed on the thin-film transistor array substrate 31. A black matrix layer for preventing color mixture between sub-pixels may be formed on the color filter array substrate 32, and a color filter layer may be formed in each pixel area within the black matrix layer.

As shown in FIG. 5, the thin-film transistor array substrate 31 according to the present disclosure may include a substrate 100, a light-blocking layer 21, a thin-film transistor 23, 25 and 28, and a pixel electrode 47. The light-blocking layer 21, which is a metal layer, is formed on the substrate 100. A buffer layer 22 is formed on the substrate 100 and the light-blocking layer 21.

The thin-film transistor 23, 25 and 28 may include an active layer 23, a gate electrode 25, and source and drain electrodes 27 and 28.

The active layer 23 includes a source region, a channel region, and a drain region, and may be formed on the buffer layer 22 above the light-blocking layer 21. A gate insulating layer 24 may be formed on the buffer layer 22 and the active layer 23.

The active layer 23 may be formed of amorphous silicon (a-Si), oxide semiconductor, or low-temperature poly silicon (LTPS).

When the active layer 23 is formed of LTPS, the light-blocking layer 21 may be formed below the active layer 23 because LTPS sensitively reacts to light. Alternatively, the light-blocking layer 21 may not be formed depending on the material of the active layer 23.

The gate electrode 25 may be formed on the gate insulating layer 24 above the channel region of the active layer 23. An interlayer insulating layer 26 may be formed on the gate insulating layer 24 and the gate electrode 25.

Portions of the gate insulating layer 24 and portions of the interlayer insulating layer 26, which overlap the source region and the drain region of the active layer 23, are removed to form first contact holes in the gate insulating layer 24 and the interlayer insulating layer 26. A source electrode 27 and a drain electrode 28 may be formed on the interlayer insulating layer 26 so as to be electrically connected to the source region and the drain region of the active layer 23 through the first contact holes.

The thin-film transistor is disposed in each pixel area, the gate electrode 25 may be connected to a gate line, the source electrode 27 may be connected to a data line, and the drain electrode 28 may be connected to the pixel electrode 47.

A first protective layer 29 and a second protective layer 41 may be formed on the interlayer insulating layer 26 and the source and drain electrodes 27 and 28, and a touch routing line (a common line) 42 may be formed on the second protective layer 41.

Although the thin-film transistor is illustrated in FIG. 5 as having a co-planar structure, the disclosure is not limited thereto. The present disclosure may also be applied to a bottom-gate structure in which the gate electrode 25 is located below the active layer 23.

A third protective layer 43 may be formed on the second protective layer 41 and the touch routing line (the common line) 42, a portion of the third protective layer 43 is removed to form a second contact hole to expose the touch routing line (the common line) 42, and touch electrodes (common electrodes) 44 and 45 may be formed so as to be electrically connected to the touch routing line (the common line) 42.

A fourth protective layer 46 may be formed on the third protective layer 43 and the touch electrodes (the common electrodes) 44 and 45. Portions of the first to fourth protective layers 29, 41, 43, and 46 may be removed to form a third contact hole to expose the drain electrode 28, and the pixel electrode 47 may be formed so as to be electrically connected to the drain electrode 28 through the third contact hole. Here, the pixel electrode 47 may be formed of a transparent conductive material such as indium tin oxide (ITO). Here, the touch electrodes 44 and 45 may be formed of a transparent conductive material such as ITO, and may be patterned in units of a plurality of adjacent sub-pixels. The touch electrodes 44 and 45 function as common electrodes during a display period, and function as touch electrodes during a touch sensing period.

That is, as shown in FIG. 6, a plurality of touch electrodes (common electrodes) TE (44 and 45) is disposed in a matrix form on the thin-film transistor array substrate 31. One touch electrode TE (44 and 45) is patterned in units of a plurality of adjacent sub-pixels. Each touch electrode TE is formed of a transparent conductive material such as indium tin oxide (ITO).

In the transparent LCD device 30 described above, during a display period, scan signals are sequentially applied to the plurality of gate lines, data voltages are applied to the plurality of data lines, and common voltages are applied to the common electrodes 44 and 45, thereby displaying an image. In addition, during a touch sensing period, a load free driving (LFD) signal such as a square wave is applied to the plurality of gate lines, the plurality of data lines, and the common electrodes 44 and 45, thereby sensing touch.

That is, during the display period, common voltages are applied to the common electrodes in order to display an image, and during the touch sensing period, the LFD signal is applied to the common electrodes in order to sense touch.

Figure 7A:
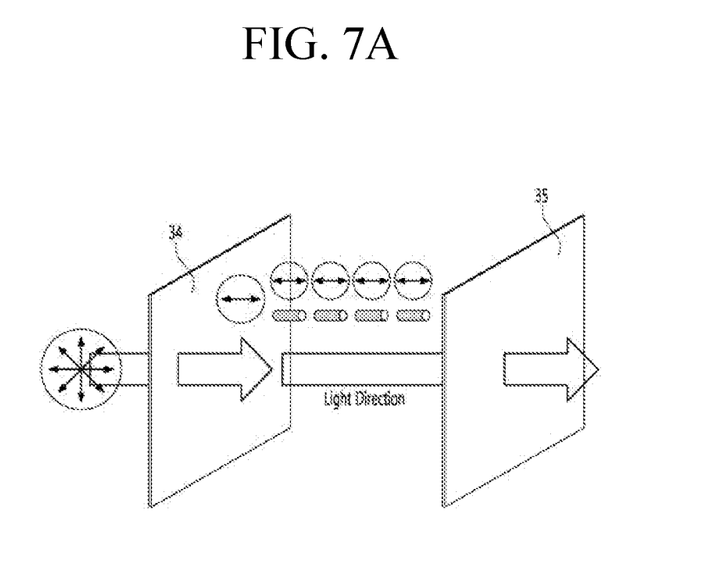
FIGS. 7A and 7B are views for explaining upper and lower polarizing plates and according to an embodiment of the present disclosure.
Figure 7B:
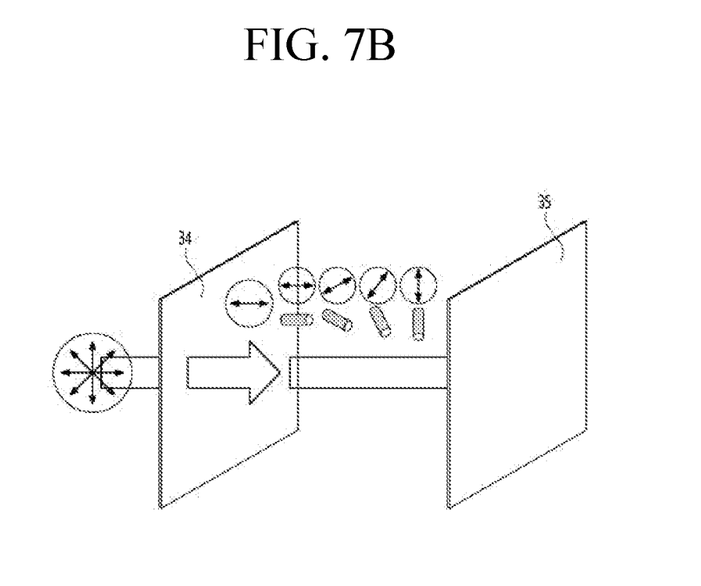

Hereinafter, the configuration of the first and second polarizing plates 35 and 34 according to the present disclosure will be described.

FIGS. 7A and 7B are views for explaining the upper and lower polarizing plates 35 and 34 according to one embodiment of the present disclosure.

As shown in FIGS. 7A and 7B, polarization axes of the upper and lower polarizing plates 35 and 34 according to the present disclosure and the orientation direction of the liquid crystal are identical to each other. Therefore, when the transparent LCD device 30 is not driven, light may be transmitted from the lower polarizing plate 34 to the upper polarizing plate 35, and when the transparent LCD device 30 is driven, a portion of light may not be transmitted from the lower polarizing plate 34 to the upper polarizing plate 35. Therefore, the transparent LCD device 30 according to the present disclosure may be in a normally white mode.

That is, the LCD smart window according to the present disclosure may be transparent when the transparent LCD device 30 is not driven, and may realize a black screen when the transparent LCD device 30 is driven.

The function (operation) of the LCD smart window according to the present disclosure configured as described above will be described below.

First, when the transparent LCD device 30 is not driven, the LCD smart window according to the present disclosure functions as a general window irrespective of day and night. That is, the LCD smart window according to the present disclosure exhibits excellent soundproofing, wind proofing, and heat insulation effects while functioning as a general transparent window.

In addition, when the transparent LCD device 30 is driven during the daytime, the LCD smart window according to the present disclosure may display an image thereon using the daylight as a backlight without driving the light source 60.

In addition, when the transparent LCD device 30 is driven at night, the LCD smart window according to the present disclosure may drive the light source 60 to display an image thereon using the light emitted from the light source 60 as a backlight.

Therefore, the LCD smart window according to the present disclosure may display an image thereon irrespective of day and night.

In the above process, when a black image is generated by the transparent LCD device 30, the LCD smart window according to the present disclosure may implement a curtain function.

Although it has been described with reference to FIGS. 7A and 7B that the transparent LCD device 30 according to the present disclosure is in a normally white mode, the disclosure is not limited thereto. The transparent LCD device 30 according to the present disclosure may be in a normally black mode in order to ensure quality of operation of the screen. In this case, when the transparent LCD device is not driven, the LCD smart window according to the present disclosure may be used in the form of a black curtain. Further, during the daytime in which external light is not necessary, the LCD smart window according to the present disclosure may display an image through application of a signal to the display panel. Furthermore, at night, the LCD smart window according to the present disclosure may drive the light source and may display an image through application of a signal to the display panel.

As is apparent from the above description, the LCD smart window according to the present disclosure having the above-described characteristics has the following effects.

First, when the transparent LCD device is not driven, the LCD smart window according to the present disclosure may function as a general transparent window having excellent soundproofing, wind proofing, and heat insulation effects irrespective of day and night, thereby reducing power consumption.

Second, during the daytime, the LCD smart window according to the present disclosure may drive the transparent LCD device to display an image thereon using the daylight as a backlight without driving the light source.

Third, the LCD smart window according to the present disclosure may also display an image thereon at night by driving both the light source and the transparent LCD device.

Fourth, the LCD smart window according to the present disclosure may implement a curtain function by driving the transparent LCD device to generate a black image, and may adjust the amount of light passing therethrough by adjusting the grayscale of the black image.

Those skilled in the art will understand that various modification and alternations are possible from the above description without departing from the technical idea of the present disclosure. Consequently, the technical scope of the present disclosure is defined by the appended claims, not by the detailed description of the present disclosure.

What is claimed is:

1. A liquid crystal display smart window comprising:
an inner glass sheet located in an indoor space;

an outer glass sheet spaced apart from the inner glass sheet by a predetermined gap, the outer glass sheet configured to be exposed to an outside of a building;

a transparent LCD device located in a space between the inner glass sheet and the outer glass sheet, the transparent LCD device configured to display an image;

a window frame to support upper and lower surfaces and both side surfaces of each of the inner glass sheet and the outer glass sheet; and a light source secured to the window frame, the light source configured to emit light to at least one surface of the outer glass sheet, wherein the light source comprises a first light-emitting diode (LED) bar and a second LED bar, each of the first LED bar and the second LED bar configured such that a plurality of LEDs are mounted on a printed circuit board, the first LED bar and the second LED bar are respectively disposed on the upper and lower surfaces of the outer glass sheet, or on the both side surfaces of the outer glass sheet, and the outer glass sheet has an engraved pattern on one surface thereof facing the transparent LCD device and is configured to function as a light guide plate that radiates light introduced thereinto from the first LED bar and the second LED bar to the transparent LCD device.

2. The LCD smart window according to claim 1, further comprising:

a gap filler filling a space between the inner glass sheet and the outer glass sheet.

3. The LCD smart window according to claim 2, wherein the gap filler is between the inner glass sheet and the outer glass sheet, and is disposed at portions where the upper and lower surfaces and both side surfaces of each of the inner glass sheet and the outer glass sheet that are adjacent to the window frame.

4. The LCD smart window according to claim 1, wherein the transparent LCD device is adhered to the inner glass sheet by a transparent optical adhesive.

5. The LCD smart window according to claim 1, wherein the window frame has a guide groove in a lower surface thereof and is configured to be movable along a guide rail of a window sill.

6. The LCD smart window according to claim 1, wherein the transparent LCD device is an LCD device having a touch sensing function to sense a touch point and to output information corresponding to the touch point or to perform an arithmetic operation corresponding to the touch point.

7. The LCD smart window according to claim 1, wherein the transparent LCD device comprises:

a thin-film transistor array substrate;

a color filter array substrate;

a liquid crystal layer interposed between the thin-film transistor array substrate and the color filter array substrate;

a lower polarizing plate below the thin-film transistor array substrate; and an upper polarizing plate above the color filter array substrate, and wherein polarization axes of the upper polarizing plate and the lower polarizing plate and an orientation direction of a liquid crystal of the liquid crystal layer are identical to each other.

8. The LCD smart window according to claim 7, wherein the transparent LCD device is in a white mode that allows light to be transmitted from the lower polarizing plate to the upper polarizing plate when not driven.

9. The LCD smart window according to claim 7, wherein the transparent LCD device is in a black mode such that the transparent LCD device is in a form of a black curtain when not driven.

10. The LCD smart window according to claim 7, wherein when the transparent LCD device is driven, the light source is driven and the transparent LCD device displays the image using the light emitted from the light source as a backlight.

* * * * *